(12) United States Patent
Dubery et al.

(10) Patent No.: US 9,046,942 B2
(45) Date of Patent: Jun. 2, 2015

(54) COMBINED ACCUMULATOR AND MAXIMUM/MINIMUM COMPARATOR

(75) Inventors: John Stanley Dubery, Basingstoke (GB); Paul Heslop, Hampshire (GB); Yahya Yassin, Trondheim (NO)

(73) Assignee: Atmel Corporation, San Jose, CA (US)

( * ) Notice: Subject to any disclaimer, the term of this patent is extended or adjusted under 35 U.S.C. 154(b) by 358 days.

(21) Appl. No.: 13/486,562

(22) Filed: Jun. 1, 2012

(65) Prior Publication Data

US 2013/0321289 A1    Dec. 5, 2013

(51) Int. Cl.
| | | |
|---|---|---|
| G06F 3/041 | (2006.01) | |
| G06F 3/044 | (2006.01) | |
| G06F 7/57 | (2006.01) | |
| G06F 9/38 | (2006.01) | |

(52) U.S. Cl.
CPC . *G06F 3/041* (2013.01); *G06F 7/57* (2013.01); *G06F 9/3885* (2013.01); *G06F 3/0416* (2013.01); *G06F 3/044* (2013.01); *G06F 2203/04101* (2013.01)

(58) Field of Classification Search
CPC .................... G06F 3/041–3/047; G06F 9/3885
USPC .......................................... 345/173; 708/524
See application file for complete search history.

(56) References Cited

U.S. PATENT DOCUMENTS

| | | | | |
|---|---|---|---|---|
| 5,018,078 A | * | 5/1991 | Urabe et al. .................... | 345/561 |
| 5,625,764 A | * | 4/1997 | Tsujimoto et al. ............. | 345/640 |
| 6,121,799 A | * | 9/2000 | Moser .............................. | 327/58 |
| 7,663,607 B2 | | 2/2010 | Hotelling | |
| 7,875,814 B2 | | 1/2011 | Chen | |
| 7,920,129 B2 | | 4/2011 | Hotelling | |
| 7,974,996 B1 | * | 7/2011 | North et al. .................... | 708/495 |
| 8,031,094 B2 | | 10/2011 | Hotelling | |
| 8,031,174 B2 | | 10/2011 | Hamblin | |
| 8,040,326 B2 | | 10/2011 | Hotelling | |
| 8,049,732 B2 | | 11/2011 | Hotelling | |
| 8,179,381 B2 | | 5/2012 | Frey | |
| 2002/0015024 A1 | * | 2/2002 | Westerman et al. ........... | 345/173 |
| 2009/0315854 A1 | | 12/2009 | Matsuo | |
| 2012/0242588 A1 | | 9/2012 | Myers | |
| 2012/0242592 A1 | | 9/2012 | Rothkopf | |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — Dorothy Harris
(74) *Attorney, Agent, or Firm* — Baker Botts LLP (57) ABSTRACT

In one embodiment, a method comprises detecting, by a hardware accelerator, that a value has been written to a first location of a memory, the first location identified by a first address. The method further includes adding the value to an accumulated value stored in an accumulator register of the hardware accelerator and storing the result in the accumulator register. The method further includes comparing the value to a maximum value stored in a first register of the hardware accelerator and overwriting the maximum value with the value if the value is greater than the maximum value. The method also includes comparing the value to a minimum value stored in a second register of the hardware accelerator and overwriting the minimum value with the value if the value is less than the minimum value.

16 Claims, 4 Drawing Sheets

(56) References Cited

U.S. PATENT DOCUMENTS

2012/0243151 A1 9/2012 Lynch
2012/0243719 A1 9/2012 Franklin

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

COMBINED ACCUMULATOR AND MAXIMUM/MINIMUM COMPARATOR

TECHNICAL FIELD

This disclosure relates generally to microcontrollers that may be used in touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
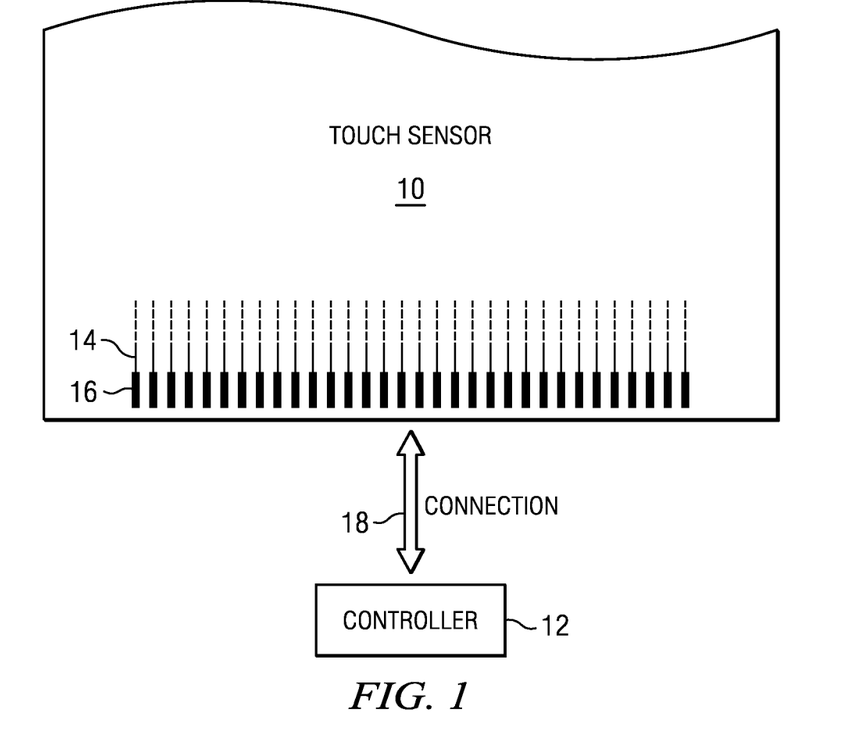
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). Touch-sensor controller 12 may have an instruction set architecture that facilitates its operation. In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Touch sensor controller 12 will be described in more detail in connection with FIG. 2. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
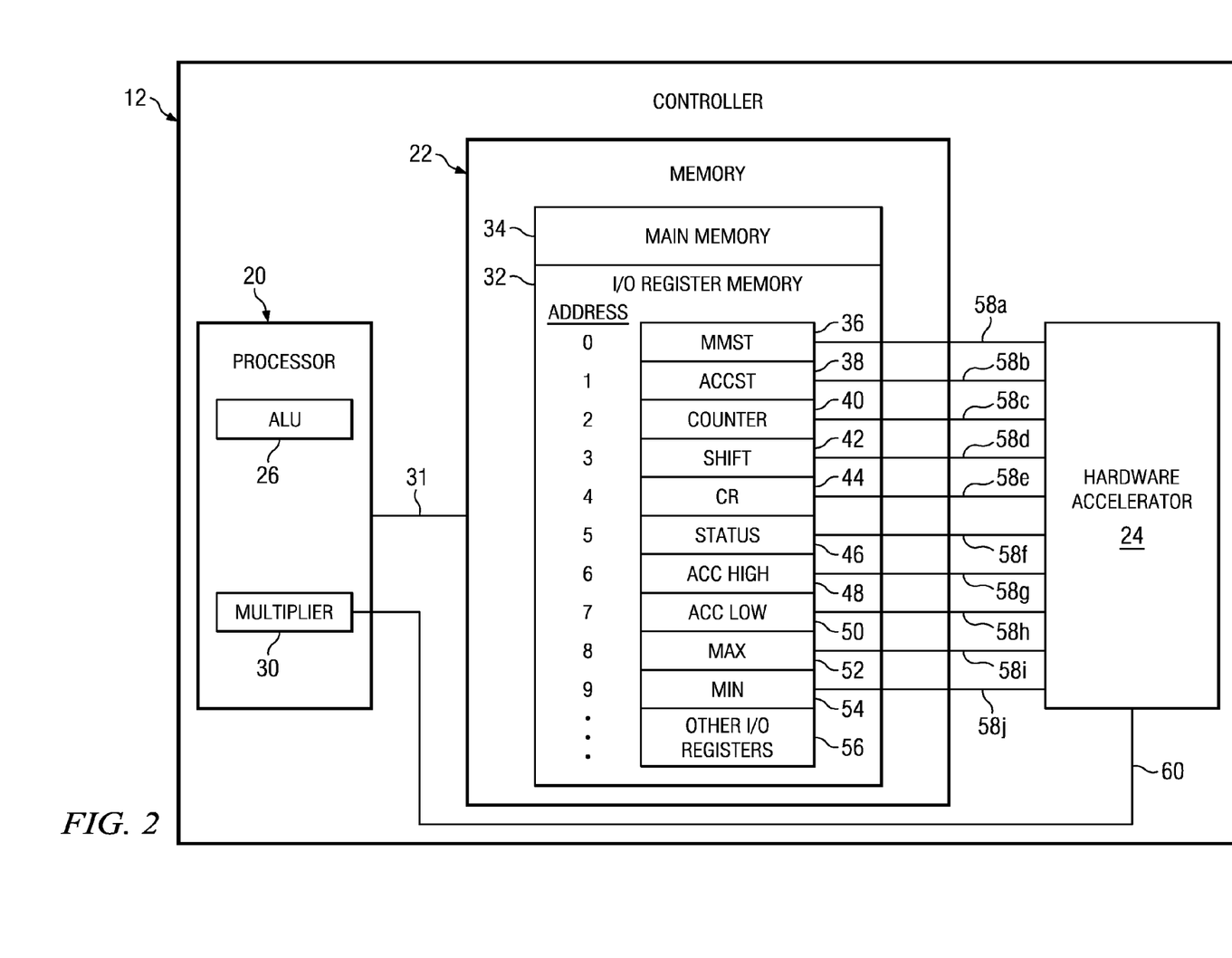
FIG. 2 illustrates the touch-sensor controller of FIG. 1 incorporating an example processor, an example memory, and an example hardware accelerator.

FIG. 2 illustrates touch-sensor controller 12 incorporating an example processor 20, an example memory 22, and an example hardware accelerator 24. In order to determine a location of a touch, touch-sensor controller 12 may perform multiple operations, including accumulating, multiplying, averaging, tracking a maximum or minimum value, or other operations. For example, detection of a touch may include averaging many samples in order to extract a relevant signal from noise. While processors are generally capable of performing such operations, they may perform multiple instructions and expend multiple processor clock cycles to accomplish a single operation and may be configured to perform operations serially rather than in parallel, further increasing the amount of time required to perform multiple operations. While a digital signal processor (DSP) may be used to perform these operations, DSPs often use more power and require complex hardware or run at a very high frequency as compared to a microcontroller. In particular embodiments, touch-sensor controller 12 includes a hardware accelerator 24 that is dedicated to performing multiple operations in parallel. Hardware accelerator 24 may speed up the inner loop of any complex algorithm which includes operations such as accumulating, averaging a set of samples, and/or tracking global maxima and minima. Multiple operations may be performed in parallel by the hardware accelerator 24 in response to the performance of a single instruction by touch-sensor controller 12. In particular embodiments, these operations may complete within a single clock cycle of touch-sensor controller 12. Although particular embodiments are described with respect to touch-sensor controller 12, the various embodiments described herein may be implemented in any suitable device, such as a different microcontroller, microprocessor, or any other device including a processor and an addressable memory.

Processor 20 may be any combination of hardware, software and/or encoded logic operable to provide, either alone or in conjunction with other components touch sensor functionality. Processor 20 may implement one or more of the functions of the processor unit described above in connection with FIG. 1. In particular embodiments, processor 20 includes logic for executing instructions, such as those making up a computer program. In particular embodiments, an instruction may include an opcode or an opcode and one or more operands. As an example and not by way of limitation, to execute instructions, processor 20 may retrieve (or fetch) instructions from an internal register, an internal cache, or memory 22; decode and execute them; and then write one or more results to an internal register, an internal cache, or memory 22. Examples of operations that instructions may specify include a multiplication of two operands specified by the instruction, writing (e.g., storing) a specified value (e.g., a value stored by a register of processor 20) to a specified address in memory 22, and reading (e.g., loading) a value at a specified address in memory 22 (e.g., into a register of processor 20).

In particular embodiments, processor 20 includes one or more internal caches for data, instructions, or addresses. This disclosure contemplates processor 20 including any suitable number of any suitable internal caches, where appropriate. As an example and not by way of limitation, processor 20 may include one or more instruction caches, one or more data caches, and one or more translation lookaside buffers (TLBs). Instructions in the instruction caches may be copies of instructions in memory 22 and the instruction caches may speed up retrieval of those instructions by processor 20. Data in the data caches may be copies of data in memory 22 for instructions executing at processor 20 to operate on; the results of previous instructions executed at processor 20 for access by subsequent instructions executing at processor 20, or for writing to memory 22; or other suitable data. The data caches may speed up read or write operations by processor 20. The TLBs may speed up virtual-address translations for processor 20. In particular embodiments, processor 20 includes one or more internal registers for data, instructions, or addresses. Depending on the embodiment, processor 20 may include any suitable number of any suitable internal registers, where appropriate. Where appropriate, processor 20 may be a multi-core processor, may be one or more processors, or be any other suitable processor.

In the embodiment depicted, processor 20 includes arithmetic logic unit (ALU) 26 and multiplier 30. ALU 26 may include logic for performing various arithmetic and logical operations. ALU 26 may load data from one or more input registers, perform an operation on that data, and store the result into an output register.

Multiplier 30 includes logic for performing a multiplication of two operands. Processor 20 may execute a multiply instruction by indicating the operands to multiplier 30 and allowing multiplier 30 to perform the multiplication of the operands. Multiplier 30 may multiply the operands together and store the result in a register. In particular embodiments, multiplier 30 is operable to provide a signal in response to a determination that the result of the multiplication is valid (i.e., the multiplication operation is complete and the output of the multiplier is the correct result). As depicted, multiplier 30 is coupled to hardware accelerator via connection 60. Connection 60 may be any suitable connection such as one or more traces on a substrate or other suitable conductive interconnect. Connection 60 may carry one or more values to hardware accelerator 24, such as the multiplier result or the signal that indicates that the multiplier result is valid.

Memory 22 may be coupled to processor 20 via connection 31. Connection 31 may be any suitable connection such as one or more traces on a substrate or other suitable conductive interconnect. Connection 31 may carry one or more values between memory 22 and processor 20. Memory 22 may include any form of volatile or non-volatile memory including, without limitation, random access memory (RAM), read-only memory (ROM), flash memory, or any other suitable memory component or components. In particular embodiments, memory 22 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 22 may include one or more memories 22, where appropriate. Memory 22 may store any suitable data or information utilized by touch-sensor controller 12, including software embedded in a computer readable medium, and/or encoded logic incorporated in hardware or otherwise stored (e.g., firmware).

Touch-sensor controller 12 may be capable of loading instructions from another source (e.g., storage external to touch-sensor controller 12) to main memory 34. Processor 20 may then load the instructions from main memory 34 to an internal register or internal cache. To execute the instructions, processor 20 may retrieve the instructions from the internal register or internal cache and decode them. During or after execution of the instructions, processor 20 may write one or more results (which may be intermediate or final results) to the internal register or internal cache. Processor 20 may then write one or more of those results to main memory 34. In particular embodiments, processor 20 executes only instructions in one or more internal registers or internal caches or in main memory 34 (as opposed to storage external to touch-sensor controller 12) or operates only on data in one or more internal registers or internal caches or in main memory 34 (as opposed to storage external to touch-sensor controller 12).

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments include one or more computer-readable storage media implementing any suitable storage. For example, a computer-readable storage medium may implement one or more portions of processor 20 (such as, for example, one or more internal registers or caches), one or more portions of memory 22, one or more portions of storage external to memory 22, or a combination of these, where appropriate. In particular embodiments, a computer-readable storage medium implements RAM or ROM. A computer-readable storage medium may implement volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

In particular embodiments, memory 22 includes main memory 34 for storing instructions for processor 20 to execute or data for processor 20 to operate on. In various embodiments, main memory 34 includes electrically erasable programmable read-only memory (EEPROM). One or more memory management units (MMUs) may reside between processor 20 and memory 22 and may facilitate access to memory 22 requested by processor 20.

Memory 22 also includes input/output (I/O) register memory 32. I/O register memory 32 includes various memory locations. These locations may refer to I/O registers located within I/O register memory 32. Alternatively, these locations may refer to I/O registers located within hardware accelerator 24 (in which case the locations are simply nets or connections in I/O register memory 32 to the physical registers of the hardware accelerator 24). In the example depicted, I/O register memory 32 includes maximum/minimum store (MMST) register 36, accumulator store (ACCST) register 38, counter register 40, shift register 42, control register (CR) 44, status register 46, accumulator high (ACC HIGH) register 48, accumulator low (ACC LOW) register 50, max register 52, min register 54, and other I/O registers 56. Each register may be identified by an address. For example, MMST register 36 is located at address 0, ACCST register 38 is located at address 1, and so on. Each I/O register is accessible by processor 20. For example, processor 20 may write to or read from MMST register 36 by performing store or load instructions (or their equivalent). When a particular I/O register is accessed by processor 20, the address of the particular I/O register may be specified by the instruction performed by processor 20. As depicted, particular I/O registers are coupled to hardware accelerator 24 via connections 58. Connections 58 may each be any suitable connection such as one or more traces on a substrate or other suitable conductive interconnect. The specific registers depicted in FIG. 2 will be described in more detail in connection with the description of hardware accelerator 24 in FIG. 3. Although the embodiment depicted shows a plurality of registers in I/O register memory 32, other embodiments may include other types of memory structures accessible by processor 20 according to addresses of the memory. As an example, instead of physical registers located in I/O register memory 32, each of the I/O registers depicted in FIG. 2 may simply be nets or connections to physical registers located within hardware accelerator 24. Thus, if processor 20 wrote a value to address 0, the value would be written to a physical register of hardware accelerator 24 rather than a register located in memory 22. Accordingly, references herein to a register of I/O register memory 32 (e.g., counter register 40) may refer to an actual register located in I/O register memory 32 or a corresponding register located in hardware accelerator 24 (in which case the register of I/O register memory 32 is simply a connection to that register).

Controller 12 also includes hardware accelerator 24. Hardware accelerator 24 is operable to access various I/O registers of I/O register memory 32. Hardware accelerator 24 may perform various operations on values stored by some of these I/O registers and may provide results for storage in particular I/O registers. Alternatively, hardware accelerator 24 may be operable to receive values directly from processor 20 and provide values directly to processor 20 (e.g., through connections that pass through I/O register memory 32). These operations are described in more detail in connection with FIG. 3.

Although certain steps are described above as being performed by certain components, in general, the steps may be performed by any suitable components. Although FIG. 2 illustrates a processor, memory, and hardware accelerator, FIG. 2 contemplates any number or arrangement of such components for performing operations related to the detection of touches at a touch sensor.

Figure 3:
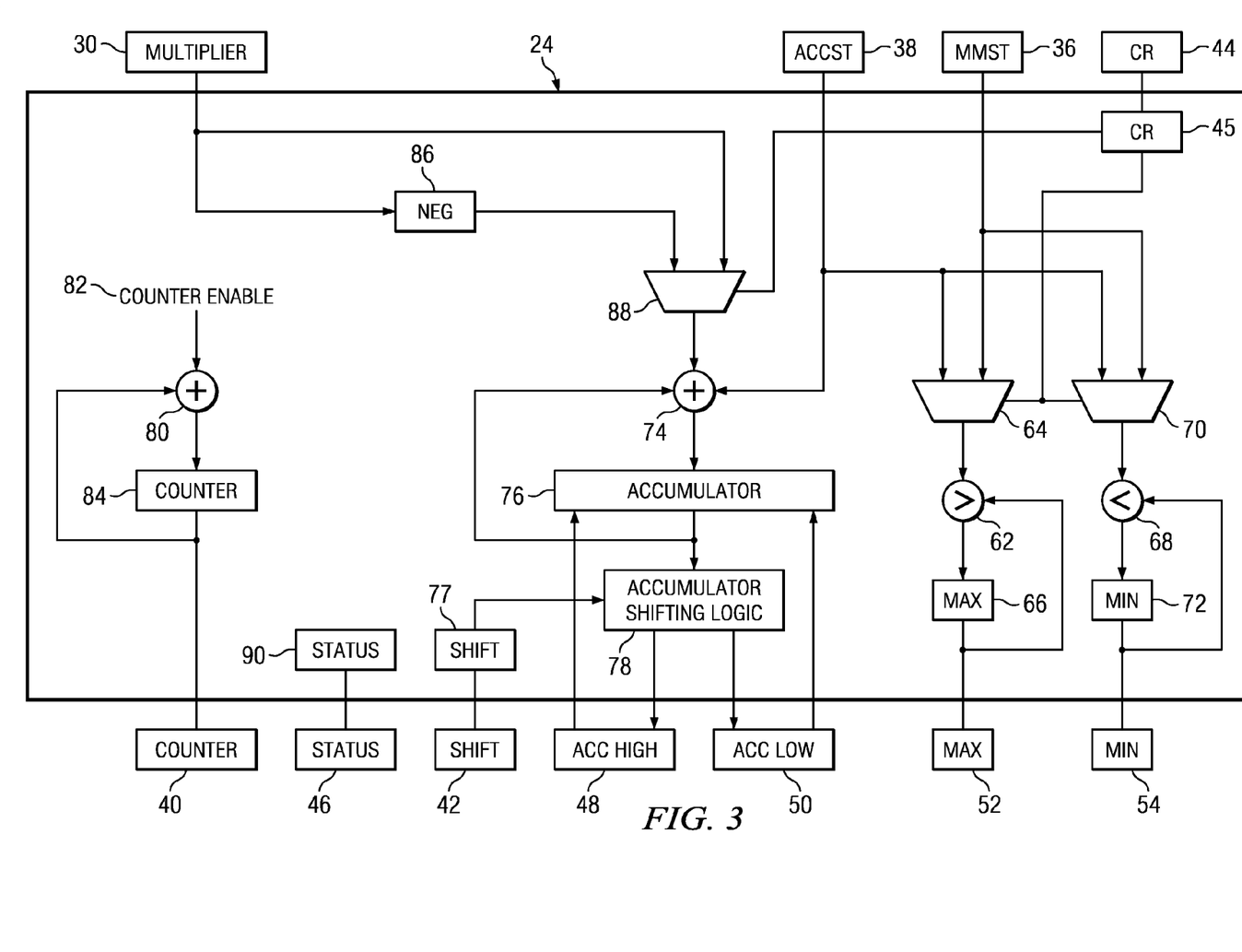
FIG. 3 illustrates the hardware accelerator of FIG. 2 incorporating an example counter, an example accumulator, and an example maximum/minimum comparator.

FIG. 3 further illustrates the hardware accelerator 24 shown in FIG. 2. In the embodiment depicted, hardware accelerator 24 includes maximum comparator 62, minimum comparator 68, accumulator 74, counter 80, and other related logic and memory. Hardware accelerator 24 is configured to receive one or more values from I/O register memory 32 and/or processor 20, perform operations on these values, and provide results to I/O register memory 32 and/or processor 20. As an example and not by way of limitation, hardware accelerator 24 may perform a set of operations in response to detecting that a value has been written to MMST register 36 and a different set of operations in response to detecting that a value has been written to ACCST register 38.

Control register 45 may include logic for controlling various functionality of hardware accelerator 24. For example, control register 45 may select values to pass through multiplexors 64, 70, and 88, may determine whether certain operations result in the incrementing of a counter value stored in counter register 84, may control the order of various operations within hardware accelerator 24, or may provide other suitable functionality.

In the embodiment depicted, control register 45 is coupled to control register 44 of memory 22. Thus one or more bits stored by control register 45 may be linked to one or more bits of control register 44. The value of control register 45 may be written to control register 44 by hardware accelerator 24 at any suitable time. The processor 20 may access the value stored by the control register by performing a read instruction that specifies the address of control register 44. In particular embodiments, the value of control register 44 may be written to control register 45 in order to set various bits of control register 45. Thus, processor 20 may set these bits by writing to control register 44 of memory 22. The bits may then be propagated to control register 45. The bits of control register 45 may also be set to an initial state by applying a reset signal to control register 45. In an alternative embodiment, control register 44 is simply a connection (rather than a physical register) between memory 22 and control register 45. Thus, processor 20 may directly access control register 45 (e.g., by writing to or reading from address "4" that corresponds to control register 44).

In particular embodiments, hardware accelerator 24 performs a maximum comparison and a minimum comparison in response to a detection that a new value has been written to MMST register 36 of memory 22. Hardware accelerator 24 may detect that a new value has been written to MMST register 36 in any suitable manner. For example, hardware accelerator 24 may receive a signal from processor 20 when a write instruction identifying the address of MMST register 36 is performed. As another example, hardware accelerator may receive a signal from memory 22 after a write has been performed to the address of MMST register 36. In response to determining that a new value has been written to MMST register 36, one or more bits of control register 45 may be set in order to pass the value from MMST register 36 through multiplexors 64 and 70 to maximum comparator 62 and minimum comparator 68. The value from MMST register 36 is compared by maximum comparator 62 against a maximum value stored in max register 66. If the value from MMST register 36 is greater than the maximum value, then the value from MMST register 36 is written to max register 66 and stored as the new maximum value. If the value from MMST register 36 is smaller than the maximum value, then the maximum value remains unchanged. The value from MMST register 36 is also compared by minimum comparator 68 against a minimum value stored in min register 72. If the value from MMST register 36 is smaller than the minimum value, then the value from MMST register 36 is written to min register 72 and stored as the new minimum value. If the value from MMST register 36 is larger than the minimum value, then the minimum value remains unchanged. The maximum comparison operation and the minimum comparison operation described above may occur in parallel and at least part of the logic for performing the maximum comparison may occur simultaneously with at least part of the logic for performing the minimum comparison.

In the embodiment depicted, the max register 66 and the min register 72 are respectively coupled to max register 52 and min register 54 of memory 22. The values of the max register 66 and the min register 72 may be stored in max register 52 and min register 54 at any suitable time. For example, the value of the max register 66 may be written to max register 52 upon a change in the value of max register 66. As another example, the value of max register 66 may be written to max register 52 at periodic intervals. Similarly, the value of min register 72 may be written to min register 54 at any suitable time. Processor 20 accesses the maximum value or minimum value by performing a read instruction that specifies the address of max register 52 or min register 54. In particular embodiments, the values of the max register 52 and the min register 54 of memory 22 may be written to max register 66 and min register 72 in order to set these registers to an initial value. Thus, processor 20 may initialize the minimum and maximum values by writing to max register 52 and min register 54 of memory 22. These values may then propagate to max register 66 and min register 72 respectively. The max register 66 and min register 72 may also be set to predetermined values by applying a reset signal to these registers. In an alternative embodiment, max register 52 is simply a connection (rather than a physical register) between memory 22 and max register 66. Thus, processor 20 may directly access max register 66 by writing to or reading from address "8" that corresponds to max register 52. Similarly, min register 54 may be a connection (rather than a physical register) between memory 22 and min register 72, and processor 20 may directly access min register 72 by writing to or reading from address "9" that corresponds to min register 54.

In particular embodiments, hardware accelerator 24 performs a different set of operations in response to a detection that a new value has been written to ACCST register 38 of memory 22. For example, hardware accelerator 24 may perform a maximum comparison, a minimum comparison, an accumulation, and a counting operation. Hardware accelerator 24 may detect that a new value has been written to ACCST register 38 in any suitable manner. For example, hardware accelerator 24 may receive a signal from processor 20 when a write instruction identifying the address of ACCST register 38 is performed. As another example, hardware accelerator 24 may receive a signal from memory 22 after a write has been performed to the address of ACCST register 38. In response to determining that a new value has been written to ACCST register 38, one or more bits of control register 45 may be set to pass the value from ACCST register 38 through multiplexors 64 and 70 to maximum comparator 62 and minimum comparator 68. The value from ACCST register 38 is compared by maximum comparator 62 against a maximum value stored in max register 66. If the value from ACCST register 38 is greater than the maximum value, then the value from ACCST register 38 is written to max register 66 and stored as the new maximum value. If the value from ACCST register 38 is smaller than the maximum value, then the maximum value remains unchanged. The value from ACCST register 38 is also compared by minimum comparator 72 against a minimum value stored in min register 66. If the value from ACCST register 38 is smaller than the minimum value, then the value from ACCST register 38 is written to min register 72 and stored as the new minimum value. If the value from ACCST register 38 is larger than the minimum value, then the minimum value remains unchanged. The maximum comparison operation and the minimum comparison operation described above may occur in parallel and at least part of the logic for performing the maximum comparison may occur simultaneously with at least part of the logic for performing the minimum comparison.

In addition to performing the maximum and minimum operations described above, hardware accelerator 24 may also perform an accumulation of the value written to ACCST register 38. The accumulation is performed by accumulator 74 which is any suitable accumulator that accumulates using any suitable logic. By way of example and not limitation, accumulator 76 may be operable to perform addition in any suitable base, such as binary. Accumulator 76 may be compatible with any suitable representation of numbers such as ones' complement, two's complement, sign-and-magnitude, and excess-K. Hardware accelerator 24 also includes an accumulator register 76 that stores an accumulated value. Upon a determination that a value has been written to ACCST register 38, the value stored in accumulator register 76 (i.e., the accumulated value) is added to the value from ACCST register 38 by accumulator 74. The result is then stored in accumulator register 76. The number of bits of the results produced by accumulator 74 (and the corresponding number of bits of accumulator register 76) may be any suitable number. In particular embodiments, it may be equal to the number of bits in the word size of processor 20. In other embodiments, it may be greater than the number of bits in the word size of processor 20. In such embodiments, the accumulated value may be split into sections which are each stored at a different address in memory 22. For example, in the embodiment depicted, the number of bits of accumulator register 76 is twice as many as the number of bits in the word size of processor 20. In the embodiment depicted, the width of registers in memory 22 matches the word size of processor 20, thus two registers (ACC HIGH register 48 and ACC LOW register 50) are required to store the accumulated value. Accordingly, the output of accumulator register 76 is coupled (via accumulator shifting logic 78 in the embodiment depicted though it may be directly coupled in other embodiments) to two locations in memory 22 (ACC HIGH register 48 and ACC LOW register 50). In this example, ACC HIGH register 48 stores the most significant bits of the accumulated value and ACC LOW register 50 stores the least significant bits of the accumulated value. Alternatively, if the accumulator 74 had the same width as the registers in memory 22, ACC HIGH register 48 and ACC LOW register 50 may be replaced with a single register.

In the embodiment depicted, the output of accumulator register 76 is coupled to accumulator shifting logic 78. Accumulator shifting logic 78 is operable to shift the accumulated value by a number of bits specified by shift register 77. In particular embodiments, accumulator shifting logic 78 includes a barrel shifter or other suitable shifter. Accumulator shifting logic 78 may shift the bits of the output of accumulator register to the right (effectively reducing the value). A default value of shift register 77 may be zero, such that the value provided by accumulator shifting logic 78 that is stored in ACC HIGH register 48 and ACC LOW register 50 of memory 22 is the same value as the output of accumulator register 76. In other embodiments, the accumulated value is shifted by the number of bits specified by shift register 77. For example, this shifting may be provided if the number of bits in the word size of processor 20 is less than the number of bits of the accumulator register 76. Such shifting may avoid the performance of additional instructions when the shifted value is processed further (e.g., as part of a fixed point conversion).

In the embodiment depicted, shift register 77 is coupled to shift register 42. The value of the shift register 77 may be written to shift register 42 by hardware accelerator 24 at any suitable time. The processor 20 may access the shifter value of shift register 42 by performing a read instruction that specifies the address of shift register 42. In particular embodiments, the value of shift register 42 may be written to shift register 77 in order to set the value of shift register 77. Thus, processor 20 may set the shift value by writing to shift register 42 of memory 22. This value is then propagated to shift register 77. The value of shift register 77 may also be set to a predetermined value (e.g., zero) by applying a reset signal to shift register 77. In an alternative embodiment, shift register 42 is simply a connection (rather than a physical register) between memory 22 and shift register 77. Thus, processor 20 may directly access shift register 77 (e.g., by writing to or reading from address "3" that corresponds to shift register 42).

In the embodiment depicted, accumulator shifting logic 78 is coupled to ACC HIGH register 48 and ACC LOW register 50. The accumulated value (which may or may not be shifted) stored by accumulator shifting logic may be written to ACC HIGH register 48 and ACC LOW register 50 by hardware accelerator 24 at any suitable time. For example, the accumulated value may be written to ACC HIGH register 48 and ACC LOW register 50 upon a change in the accumulated value. As another example, the accumulated value may be written to ACC HIGH register 48 and ACC LOW register 50 at a periodic interval. The processor 20 accesses the accumulated value by performing read instructions that specifies the address of ACC HIGH register 48 and ACC LOW register 50. In an alternative embodiment, ACC HIGH register 48 and ACC LOW register 50 are simply connections (rather than physical registers) between memory 22 and accumulator shifting logic 78. Thus, processor 20 may directly read accumulator shifting logic 78 by reading from addresses "6" and "7" that correspond to ACC HIGH register 48 and ACC LOW register 50.

ACC HIGH register 48 and ACC LOW register 50 may also be coupled to accumulator register 76. In particular embodiments, the values of ACC HIGH register 48 and ACC LOW register 50 may be written to accumulator register 76 in order to set this register. Thus, processor 20 may initialize the accumulated value by writing to ACC HIGH register 48 and ACC LOW register 50 of memory 22. These values are then propagated to accumulator register 76. The accumulated value of accumulator register 76 may also be set to a predetermined value by applying a reset signal to accumulator register 76. In an alternative embodiment, ACC HIGH register 48 and ACC LOW register 50 are simply connections (rather than physical registers) between memory 22 and accumulator 76. Thus, processor 20 may directly write to accumulator 76 by writing to addresses "6" and "7" that correspond to ACC HIGH register 48 and ACC LOW register 50.

The detection of a value written to ACCST register 38 may also initiate an incrementing operation. For example, a counter enable signal 82 may be activated in response to the value being written to ACCST register 38. This signal is coupled to counter 80 and causes the value stored in counter register 84 to be incremented. Accordingly, counter register 84 may track the number of times that ACCST register 38 is written to and the number of accumulations that have been performed. This functionality, in combination with the accumulation operations, may enable averaging operations to be performed based on the results produced by hardware accelerator 24.

In the embodiment depicted, counter register 84 is coupled to counter register 40. The value of the counter register 84 may be written to counter register 40 by hardware accelerator 24 at any suitable time. For example, the value of counter register 84 may be written to counter register 40 upon a change in the value of counter register 84. As another example, the value of counter register 84 may be written to counter register 40 at a periodic interval. The processor 20 accesses the counter value by performing a read instruction that specifies the address of counter register 40. In particular embodiments, the value of counter register 40 may be written to counter register 84 in order to set this register to an initial value. Thus, processor 20 may initialize the counter value by writing to counter register 40 of memory 22. This value is then propagated to counter register 84. The counter value of counter register 84 may also be set to a predetermined value by applying a reset signal to counter register 84. In an alternative embodiment, counter register 40 is simply a connection (rather than a physical register) between memory 22 and counter register 84. Thus, processor 20 may directly access shift register 84 (e.g., by writing to or reading from address "2" that corresponds to shift register 42).

Hardware accelerator 24 may also be operable to accumulate results obtained from a multiplier 30 that is external to hardware accelerator 24. For example, multiplier 30 may be included within processor 20 as depicted in FIG. 2. Processor 20 may perform a multiply instruction utilizing multiplier 30 and the result may be sent to the hardware accelerator 24 across one or more connections 60. In particular embodiments, hardware accelerator 24 includes negating logic 86 that is operable to negate the value received from multiplier 30. Negating logic 86 may generate the negative value of the multiplier result in any suitable manner. As an example and not by way of limitation, negating logic 86 may calculate the two's complement of the multiplier result and present this to multiplexor 88. Based on a value provided by control register 45, either the multiplier result or the negated multiplier result is passed to the accumulator 74 through multiplexor 88. The output of multiplexer 88 is added to the accumulated value stored in accumulator register 76 and the result is stored as the new accumulated value in accumulator register 76. The output of multiplexer 88 may be added to the accumulated value at any suitable time. For example, if the value from ACCST register 38 arrives at substantially the same time as the output of multiplexor 88, hardware accelerator 24 will coordinate such that the values are accumulated in succession. As another example, if the value from the multiplexor 88 arrives while the value from ACCST 38 is being accumulated, hardware accelerator 24 will delay the accumulation of the multiplier result until the value from ACCST register 38 is finished accumulating. Hardware accelerator 24 may also be configured to increment the counter value 84 for each multiplier result that is accumulated, for only specific multiplier results that are accumulated, or to not increment the counter value for any accumulated multiplier results. In various embodiments, processor 20 may control whether or not the accumulation of the multiplier result increments the counter value. For example, processor 20 may write a value to a register in memory 22 (e.g., control register 44) that indicates whether accumulation of a multiplier result should increment the counter value. This value may be used to set counter enable signal 82 to control whether counter 80 increments the counter value.

In this manner, the hardware accelerator 24 enables touch-sensor controller 12 to perform a multiply-accumulate function in one clock cycle of processor 20. Such a function is a basic operation used in signal processing, such as processing related to touch-sensing. As an example, in such embodiments hardware accelerator 24 may calculate the weighted average of multiple samples.

Status register 90 stores various indicators. In various embodiments, hardware accelerator 24 includes logic for calculating whether the accumulated value stored in accumulator register 76 is valid. For example, the accumulated value may be valid until an the accumulation of a new value causes an overflow. The overflow could occur when the maximum value of accumulator register 76 is exceeded or when the accumulated value drops below zero (e.g., after an accumulation of a negative multiplier result). The indication of whether the accumulated value is valid may be stored in status register 90. Status register 90 may include a similar indicator for the validity of the counter value stored in counter register 84.

In the embodiment depicted, status register 90 is coupled to status register 46. The value of the status register 90 may be written to status register 46 by hardware accelerator 24 at any suitable time. For example, the value of status register 90 may be written to status register 46 upon a change in the value of status register 90. As another example, the value of status register 90 may be written to status register 46 at a periodic interval. The processor 20 accesses the status value by performing a read instruction that specifies the address of status register 46. In particular embodiments, the value of status register 46 may be written to status register 90 in order to set this register to an initial value. Thus, processor 20 may initialize the status value by writing to status register 46 of memory 22. This value is then propagated to status register 90. The status value of status register 90 may also be set to a predetermined value by applying a reset signal to status register 90. In an alternative embodiment, status register 46 is simply a connection (rather than a physical register) between memory 22 and status register 90. Thus, processor 20 may directly access shift register 90 (e.g., by writing to or reading from address "5" that corresponds to shift register 42).

Although certain steps are described above as being performed by certain components, in general, the steps may be performed by any suitable components. Although FIG. 3 illustrates an accumulator, counter, maximum comparator, and minimum comparator, FIG. 3 contemplates any number or arrangement of such components for performing operations in response to a detection that a value has been written to a particular memory location. Furthermore, any one or more operations (e.g., accumulating, counting, comparing) of hardware accelerator 24 may be performed in response to a detection that any suitable I/O register has been written to. Thus, a particular set of operations could be performed when a particular I/O register is written to, a different set of operations could be performed when a different I/O register is written to, and so on. A set of operations may include any one or more of the operations described herein or other suitable operations.

Figure 4:
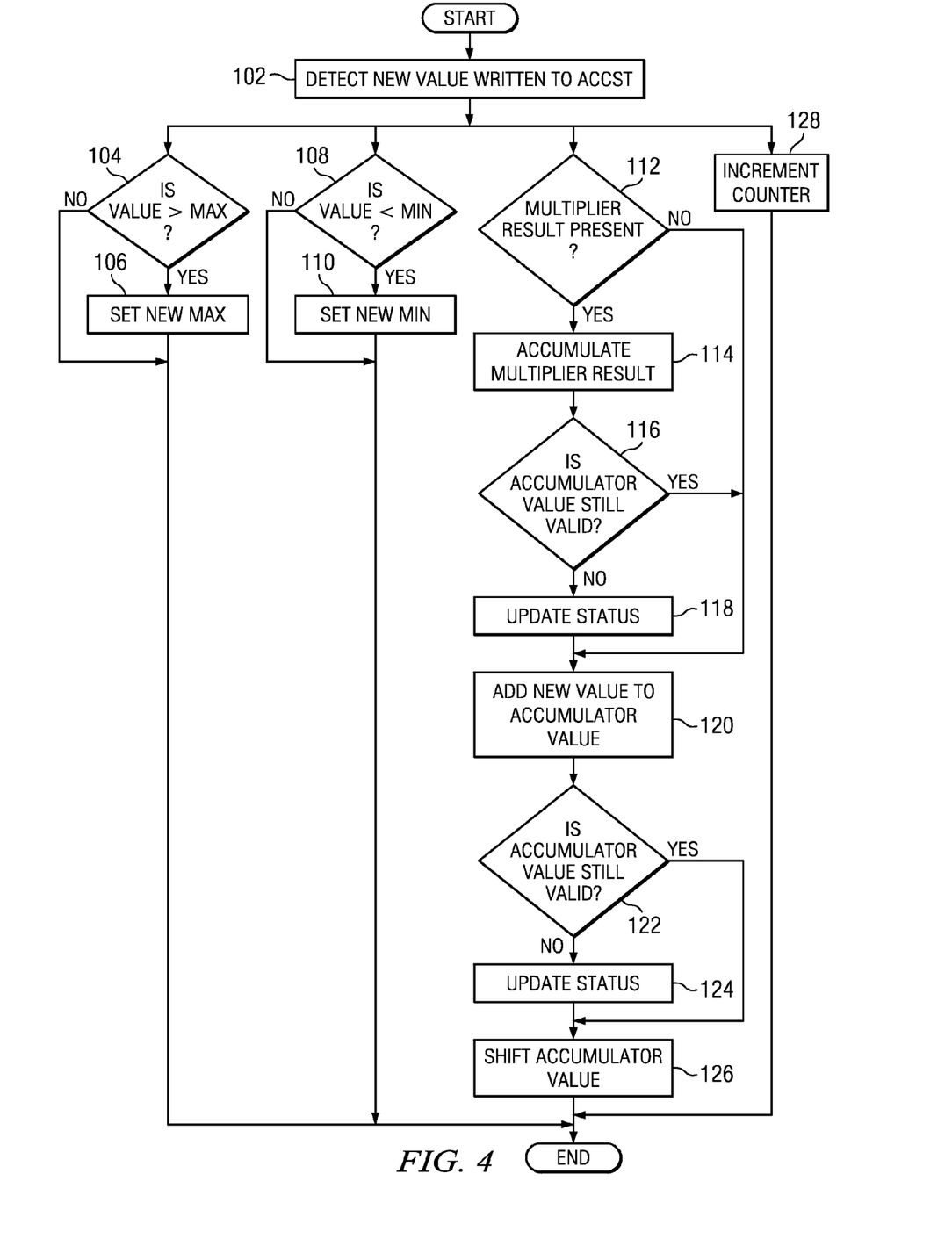
FIG. 4 illustrates an example method for operating the example hardware accelerator of FIG. 3.

FIG. 4 illustrates an example method for operating the example hardware accelerator 24 of FIG. 3. For illustrative purposes, FIG. 4 will be described with respect to the embodiments depicted in FIGS. 2 and 3. As depicted, various branches of the method may be performed in parallel. For example, one or more of the series of steps beginning with step 104 may be performed concurrently with one or more of the series of steps beginning with step 108 or one or more of the series of steps beginning with step 112.

The method begins at step 102, where hardware accelerator 24 detects that a new value has been written to ACCST register 38. Upon this detection, various operations may be performed in parallel. At step 104, it is determined whether the new value is greater than a maximum value stored in max register 66. This determination is performed by comparator 62. If the new value is not greater than the maximum value, then the maximum value stored by maximum register 66 remains unchanged and this branch of the method ends. If the new value is greater than the maximum value, then the new value is saved in max register 66 as the maximum value and this branch of the method ends.

At step 108, it is determined whether the new value is less than a minimum value stored in min register 72. This determination is performed by comparator 68. If the new value is not less than the minimum value, then the minimum value stored by min register 72 remains unchanged and this branch of the method ends. If the new value is less than the minimum value, then the new value is saved in min register 72 as the minimum value and this branch of the method ends.

At step 112, it is determined whether a valid multiplier result from multiplier 30 is waiting to be accumulated. If a multiplier result is waiting, it is accumulated at step 114. This step includes adding, by accumulator 74, the multiplier result to an accumulated value stored in accumulator register 76. The multiplier result that is accumulated may be the actual result from multiplier 30 or the negative value of the result depending on the value of one or more bits of the control register 45. At step 116, it is determined whether the accumulated value stored in accumulator register 76 is still valid. For example, it may be determined whether an overflow has occurred. If the accumulated value is no longer valid, status register 90 is updated to reflect this at step 118. If the accumulated value is still valid, the method proceeds to step 120, where the new value written from ACCST register 38 is added to the accumulated value stored in accumulator register 76. At step 122, it is determined whether the accumulated value stored in accumulator register 76 is still valid. If the accumulated value is no longer valid, status register 90 is updated to reflect this at step 124. At step 126, the accumulated value is obtained by accumulator shifting logic 78 and shifted a number of bits specified by shift register 77. The shifted value may then be stored in memory 22 for access by processor 20 and this branch of the method ends (alternatively, processor 20 may directly access the shifted value from accumulator shifting logic 78).

At step 128, a counter value stored in counter register 84 is incremented in order to track the number of samples that have been accumulated. In various embodiments, the counter value is incremented every time a new value is written to ACCST register 38. In particular embodiments, the counter value may or may not be incremented when a multiplier result is added to the accumulated value.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. For example, the multiplier result may be accumulated after the value from ACCST register 38 is accumulated or upon becoming available regardless of whether ACCST register 38 has recently been written to. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4. As described above, different functions may be performed when different locations in memory are written to. For example, if MMST register 36 is written to, one or more of steps 104, 106, 108, and 110 may be performed, while the other steps illustrated in FIG. 4 are omitted.

Particular embodiments of the present disclosure may provide one or more or none of the following technical advantages. In particular embodiments, a hardware accelerator may perform various operations in response to a detection that a location in memory has been written to. Particular embodiments may perform different sets of operations based upon which location in memory has been written to. Particular embodiments may significantly decrease the number of processor instructions that are performed to effectuate one or more particular operations.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device comprising:
a touch sensor comprising a plurality of nodes;
microcontroller configured to provide a plurality of drive signals to the touch sensor and detect a touch at one or more of the plurality of nodes, the microcontroller comprising:
a memory including a first location identified by a first address and a second location identified by a second address;
a processor coupled to the memory, the processor operable to write a value to the first location or the second location of the memory by performing an instruction that specifies the value and the first address or the second address; and
a hardware accelerator, the hardware accelerator coupled to the memory and configured to:
perform the following in response to a detection that the value has been written to the first location of the memory:
add the value to an accumulated value stored in an accumulator register of the hardware accelerator and store the result in the accumulator register;
increment a counter of the hardware accelerator;
compare the value to a maximum value stored in a first register of the hardware accelerator and overwrite the maximum value with the value when the value is greater than the maximum value; and
compare the value to a minimum value stored in a second register of the hardware accelerator and overwrite the minimum value with the value when the value is less than the minimum value; and
perform the following, without adding the value to an accumulated value stored in an accumulator register of the hardware accelerator and storing the result in the accumulator register, in response to a detection that the value has been written to the second location of the memory:
compare the value to the maximum value stored in the first register of the hardware accelerator and overwrite the maximum value with the value when the value is greater than the maximum value; and
compare the value to the minimum value stored in the second register of the hardware accelerator and overwrite the minimum value with the value when the value is less than the minimum value.

2. An apparatus comprising:
a memory including a first location identified by a first address;
a processor of a microcontroller, the microcontroller configured to provide a plurality of drive signals to a touch sensor, the processor coupled to the memory, the processor operable to write a value to a first location of the mentor), by performing an instruction that specifies the value and the first address; and
a hardware accelerator, distinct from the processor, comprising a maximum comparator, a minimum comparator, an accumulator, and a counter, the hardware accelerator coupled to the memory and configured to , in response to a determination that the value has been written to the location, perform parallel operations within a single clock cycle of the processor comprising:
add the value to an accumulated value stored in an accumulator register of the hardware accelerator and store the result in the accumulator register;
compare the value to a maximum value stored in a first register of the hardware accelerator and overwrite the maximum value with the value when the value is greater than the maximum value;
compare the value to a minimum value stored in a second register of the hardware accelerator and overwrite the minimum value with the value when the value is less than the minimum value; and
increment the counter when the value is added to the accumulated value and a control value written to a third register of the hardware accelerator indicates that the counter should be incremented.

3. The apparatus of claim 2, wherein the hardware accelerator is further configured to increment a counter of the hardware accelerator in response to the determination that the value has been written to the first location.

4. The apparatus of claim 2, wherein the value is a first value and the hardware accelerator is further configured to perform the following in response to a determination that a second value has been written to a second location of the memory that is identified by a second address:
compare the second value to the maximum value stored in the first register of the hardware accelerator and overwrite the maximum value with the second value when the second value is greater than the maximum value; and
compare the second value to the minimum value stored in the second register of the hardware accelerator and overwrite the minimum value with the second value when the second value is less than the minimum value.

5. The apparatus of claim 4, wherein the hardware accelerator is further configured to not add the second value to the accumulated value stored in the accumulator register of the hardware accelerator in response to the determination that the second value has been written to the second location.

6. The apparatus of claim 4, wherein the hardware accelerator further comprises at least one multiplexor for coupling the first location of the memory or the second location of the memory to logic that performs the comparisons with the minimum and maximum values.

7. The apparatus of claim 2, wherein the hardware accelerator is further configured to barrel shift the accumulated value to generate a shifted accumulated value and provide the shifted accumulated value to the memory.

8. The apparatus of claim 2, wherein the hardware accelerator is further configured to detect that a multiplier has performed an operation and to add an output of the multiplier to the accumulated value in response to the detection that the multiplier has performed the operation.

9. The apparatus of claim 8, wherein the hardware accelerator is further configured to increment a counter of the hardware accelerator in response to the detection that the multiplier has performed the operation.

10. The apparatus of claim 8, wherein the hardware accelerator further comprises logic for negating the output of the multiplier and adding the negated output to the accumulated value.

11. A method comprising:
detecting, by a hardware accelerator, that a value associated with a touch panel has been written to a first location of a memory, the first location identified by a first address;
performing in parallel, by the hardware accelerator, the following, within a single clock cycle of the processor, in response to detecting that the value has been written to the first location of the memory:
adding the value to an accumulated value stored in an accumulator register of the hardware accelerator and storing the result in the accumulator register;
comparing the value to a maximum value stored in a first register of the hardware accelerator and overwriting the maximum value with the value when the value is greater than the maximum value;
comparing the value to a minimum value stored in a second register of the hardware accelerator and overwriting the minimum value with the value when the value is less than the minimum value; and
incrementing a counter when the value is added to the accumulated value and a control value written to a third register of the hardware accelerator indicates that the counter should be incremented.

12. The method of claim 11, further comprising incrementing a counter of the hardware accelerator in response to the determination that the value has been written to the first location.

13. The method of claim 11, wherein the value is a first value and the method further comprises performing the following in response to a determination that a second value has been written to a second location of the memory that is identified by a second address:
comparing the second value to the maximum value stored in the first register of the hardware accelerator and overwriting the maximum value with the second value when the second value is greater than the maximum value; and
comparing the second value to the minimum value stored in the second register of the hardware accelerator and overwriting the minimum value with the second value when the second value is less than the minimum value.

14. The method of claim 13, further comprising selecting one of the first location of the memory or the second location of the memory to couple to logic that performs the comparisons with the minimum and maximum values.

15. The method of claim 11, further comprising shifting the accumulated value by a predetermined number of bits to generate a shifted accumulated value and providing the shifted accumulated value to the memory, 16. The method of claim 11, further comprising:
detecting that a multiplier has performed an operation; and
adding an output of the multiplier to the accumulated value in response to the detection that the multiplier has performed the operation.

* * * * *

UNITED STATES PATENT AND TRADEMARK OFFICE
CERTIFICATE OF CORRECTION

| | |
|---|---|
| PATENT NO. | : 9,046,942 B2 |
| APPLICATION NO. | : 13/486562 |
| DATED | : June 2, 2015 |
| INVENTOR(S) | : John Stanley Dubery |

It is certified that error appears in the above-identified patent and that said Letters Patent is hereby corrected as shown below:

In the claims:

Column 18, Line 37: After "location of the" and before "by performing" delete "mentor)" and insert --memory--.

Column 18, Line 44: After "written to the" and before "location" insert --first--.

Signed and Sealed this
Twenty-ninth Day of March, 2016

Michelle K. Lee
*Director of the United States Patent and Trademark Office*